US012634357B2

(12) United States Patent
Cai et al.

(10) Patent No.: US 12,634,357 B2
(45) Date of Patent: May 19, 2026

(54) SYSTEM, METHOD, APPARATUS, DEVICE AND STORAGE MEDIUM FOR CO-HOSTING

(71) Applicant: BEIJING BYTEDANCE NETWORK TECHNOLOGY CO., LTD., Beijing (CN)

(72) Inventors: Tengyuan Cai, Beijing (CN); Xiaozhou Cao, Beijing (CN); Yixu Wang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/569,658

(22) PCT Filed: Jun. 13, 2022

(86) PCT No.: PCT/CN2022/098368
§ 371 (c)(1),
(2) Date: Dec. 13, 2023

(87) PCT Pub. No.: WO2022/262670
PCT Pub. Date: Dec. 22, 2022

(65) Prior Publication Data
US 2024/0283831 A1 Aug. 22, 2024

(30) Foreign Application Priority Data
Jun. 15, 2021 (CN) ........................ 202110660881.X

(51) Int. Cl.
*H04L 65/401* (2022.01)
*H04L 65/1069* (2022.01)
(Continued)

(52) U.S. Cl.
CPC ...... *H04L 65/4015* (2013.01); *H04L 65/1069* (2013.01); *H04L 65/1093* (2013.01); *H04L 65/403* (2013.01)

(58) Field of Classification Search
CPC ............. H04L 65/4015; H04L 65/1069; H04L 65/1093; H04L 65/403
(Continued)

(56) References Cited

U.S. PATENT DOCUMENTS 8,819,719 B1    8/2014  Chen et al.
2011/0082942 A1  4/2011  Takei et al.
(Continued)

FOREIGN PATENT DOCUMENTS

CN        104618785 A      5/2015
CN        106454389 A      2/2017
(Continued)

OTHER PUBLICATIONS

International Search Report (with English translation) and Written Opinion issued in PCT/CN2022/098368, dated Sep. 7, 2022, 8 pages provided.
(Continued)

*Primary Examiner* — Glenford J Madamba
(74) *Attorney, Agent, or Firm* — Astute IP Law Group

(57) ABSTRACT

The present disclosure provides a method, an apparatus, a device and storage medium for co-hosting. A co-hosting invitee end receives a co-hosting request from a co-hosting inviting end through a co-hosting business server, and upon receipt of a co-hosting acceptance operation for the co-hosting request, pushes an audio-video stream to a real-time collaboration (RTC) server. Upon receipt of a notification message of successfully joining a co-hosting room from the RTC server, the co-hosting inviting end pushes an audio-video stream to the RTC server.

19 Claims, 5 Drawing Sheets

(51) Int. Cl.
    *H04L 65/1093*     (2022.01)
    *H04L 65/403*     (2022.01)
(58) Field of Classification Search
    USPC ........................................................ 709/204
    See application file for complete search history.

(56)            References Cited

U.S. PATENT DOCUMENTS

| | | |
|---|---|---|
| 2015/0350723 A1 | 12/2015 | He |
| 2017/0070773 A1 | 3/2017 | Phillips et al. |
| 2017/0155928 A1 | 6/2017 | Wei |
| 2019/0313146 A1 | 10/2019 | Kakuschke et al. |
| 2020/0186639 A1 | 6/2020 | Borukhoff |

FOREIGN PATENT DOCUMENTS

| | | | | |
|---|---|---|---|---|
| CN | 107342978 | A | 11/2017 | |
| CN | 107846379 | A | 3/2018 | |
| CN | 108076349 | A | 5/2018 | |
| CN | 108989836 | A | 12/2018 | |
| CN | 109995741 | A | 7/2019 | |
| CN | 110324655 | A | 10/2019 | |
| CN | 110430439 | A | 11/2019 | |
| CN | 110740346 | A | 1/2020 | |
| CN | 111050185 | A | 4/2020 | |
| CN | 111107441 | A | 5/2020 | |
| CN | 111372090 | A | 7/2020 | |
| CN | 111372092 | A | 7/2020 | |
| CN | 111385666 | A | 7/2020 | |
| CN | 112003711 | A | 11/2020 | |
| CN | 112019927 | A | 12/2020 | |
| CN | 112291316 | A | 1/2021 | |
| CN | 112291583 | A | 1/2021 | |
| CN | 112312154 | A | 2/2021 | |
| CN | 112511783 | A | 3/2021 | |
| CN | 112738638 | A | 4/2021 | |
| EP | 3993432 | A1 * | 5/2022 | ......... H04N 21/4788 |
| JP | 2009500934 | A | 1/2009 | |
| JP | 2015150270 | A | 8/2015 | |
| JP | 2020129207 | A | 8/2020 | |
| WO | 2018121015 | A1 | 7/2018 | |
| WO | 2019071829 | A1 | 4/2019 | |

OTHER PUBLICATIONS

Office Action issued in corresponding Chinese Application No. 202110660881.X, dated Jun. 1, 2023, with machine translation.
The Extended European Search Report issued in European Application No. 22824150.1, dated Mar. 15, 2024.
Office Action for Japanese Patent Application No. 2023-577422, mailed on Dec. 3, 2024, 9 pages.

\* cited by examiner

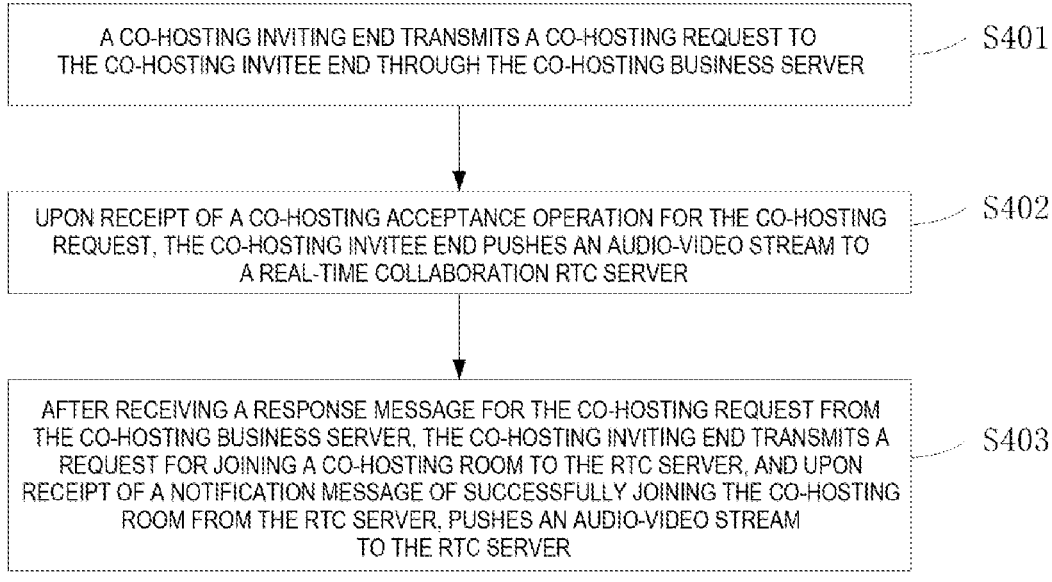

A CO-HOSTING INVITING END TRANSMITS A CO-HOSTING REQUEST TO THE CO-HOSTING INVITEE END THROUGH THE CO-HOSTING BUSINESS SERVER — S401

UPON RECEIPT OF A CO-HOSTING ACCEPTANCE OPERATION FOR THE CO-HOSTING REQUEST, THE CO-HOSTING INVITEE END PUSHES AN AUDIO-VIDEO STREAM TO A REAL-TIME COLLABORATION RTC SERVER — S402

AFTER RECEIVING A RESPONSE MESSAGE FOR THE CO-HOSTING REQUEST FROM THE CO-HOSTING BUSINESS SERVER, THE CO-HOSTING INVITING END TRANSMITS A REQUEST FOR JOINING A CO-HOSTING ROOM TO THE RTC SERVER, AND UPON RECEIPT OF A NOTIFICATION MESSAGE OF SUCCESSFULLY JOINING THE CO-HOSTING ROOM FROM THE RTC SERVER, PUSHES AN AUDIO-VIDEO STREAM TO THE RTC SERVER — S403

FIG. 4

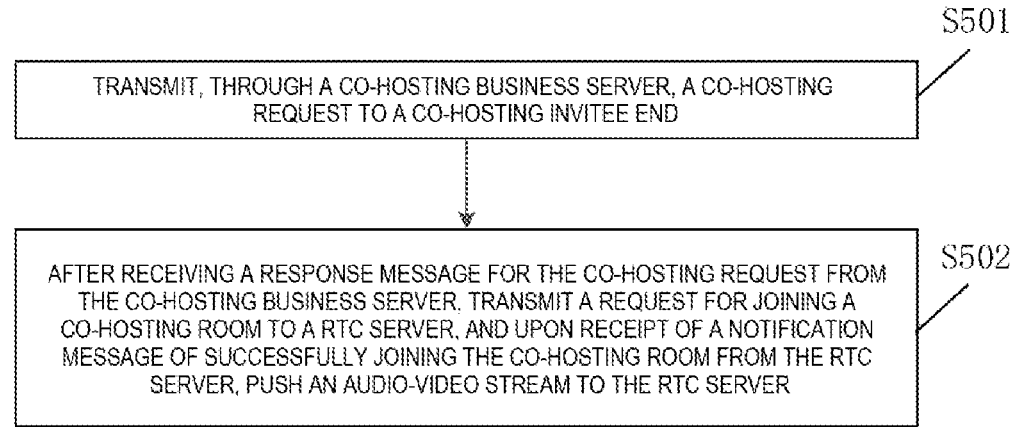

S501

TRANSMIT, THROUGH A CO-HOSTING BUSINESS SERVER, A CO-HOSTING REQUEST TO A CO-HOSTING INVITEE END

S502

AFTER RECEIVING A RESPONSE MESSAGE FOR THE CO-HOSTING REQUEST FROM THE CO-HOSTING BUSINESS SERVER, TRANSMIT A REQUEST FOR JOINING A CO-HOSTING ROOM TO A RTC SERVER, AND UPON RECEIPT OF A NOTIFICATION MESSAGE OF SUCCESSFULLY JOINING THE CO-HOSTING ROOM FROM THE RTC SERVER, PUSH AN AUDIO-VIDEO STREAM TO THE RTC SERVER

RECEIVE, THROUGH A CO-HOSTING BUSINESS SERVER, A CO-HOSTING REQUEST
FROM A CO-HOSTING INVITING END

S602

UPON RECEIPT OF A CO-HOSTING ACCEPTANCE OPERATION FOR THE CO-HOSTING
REQUEST, PUSH AN AUDIO-VIDEO STREAM TO THE RTC SERVER

FIRST TRANSMITTING
MODULE — 701

SECOND TRANSMITTING
MODULE — 702

FIRST PUSH MODULE — 703

SYSTEM, METHOD, APPARATUS, DEVICE AND STORAGE MEDIUM FOR CO-HOSTING

CROSS-REFERENCE TO RELATED APPLICATION(S)

This application claims the benefit of Chinese Patent Application No. 202110660881.X filed on Jun. 15, 2021, entitled "SYSTEM, METHOD, APPARATUS, DEVICE AND STORAGE MEDIUM FOR CO-HOSTING", which is hereby incorporated by reference in its entirety.

FIELD

The present disclosure relates to the field of data processing and in particular, to a system, method, apparatus, device and storage medium for co-hosting.

BACKGROUND

Among the network live streaming functions, co-hosting has become a common form of live streaming. Typically, co-hosting refers to a real-time communication interaction between live streamers or a live streamer and a viewer in a way similar to a video telephone.

SUMMARY

In order to solve all or at least a part of the above technical problems, the present disclosure provides a system, a method, an apparatus, a device and storage medium for co-hosting.

In a first aspect, the present disclosure provides a system for co-hosting. The system comprises a co-hosting business server, a co-hosting inviting end and a co-hosting invitee end;

the co-hosting invitee end is configured to receive a co-hosting request from the co-hosting inviting end through the co-hosting business server, and upon receipt of a co-hosting acceptance operation for the co-hosting request, push an audio-video stream to a real-time collaboration, RTC, server; and the co-hosting inviting end is configured to after receiving a response message for the co-hosting request from the co-hosting business server, transmit a request for joining a co-hosting room to the RTC server, and upon receipt of a notification message of successfully joining the co-hosting room from the RTC server, push an audio-video stream to the RTC server.

In an optional implementation, the co-hosting invitee end further is configured to upon receipt of the co-hosting acceptance operation for the co-hosting request, start rendering an audio-video stream pushed by the co-hosting inviting end.

In an optional implementation, the co-hosting invitee end is further configured to upon receipt of the co-hosting request from the co-hosting inviting end through the co-hosting business server, transmit a suspension indication message to the RTC server; and upon receipt of the co-hosting acceptance operation for the co-hosting request through the co-hosting business server, transmit an unsuspension indication message to the RTC server;

wherein the suspension indication message is used to indicate the RTC server to suspend a delivery of an audio-video stream pushed by the co-hosting inviting end to the co-hosting invitee end, and the unsuspension indication message is used to indicate the RTC server to start delivering the audio-video stream pushed by the co-hosting inviting end to the co-hosting invitee end.

In an optional implementation, the system further comprises the RTC server;

the RTC server is configured to store the audio-video stream pushed by the co-hosting inviting end, and upon receipt of the suspension indication message from the co-hosting invitee end, suspend the delivery of the audio-video stream to the co-hosting invitee end, and upon receipt of the unsuspension indication message from the co-hosting invitee end, start delivering the audio-video stream to the co-hosting invitee end.

In an optional implementation, the co-hosting invitee end is further configured to upon receipt of the co-hosting acceptance operation for the co-hosting request, transmit a second stream combination indication message to the RTC server; wherein the second stream combination indication message is used for indicating enabling stream combination.

In an optional implementation, the co-hosting invitee end is further configured to upon receipt of the co-hosting acceptance operation for the co-hosting request, transmit a second stream combination indication message to the RTC server; wherein the second stream combination indication message is used for indicating enabling stream combination.

In an optional implementation, both the co-hosting invitee end and the co-hosting inviting end are live streamer ends.

In a second aspect, the present disclosure provides a method for co-hosting. The method for co-hosting comprises:

transmitting, at a co-hosting inviting end, a co-hosting request to a co-hosting invitee end through a co-hosting business server;

pushing, at the co-hosting invitee end, an audio-video stream to a real-time collaboration, RTC, server upon receipt of a co-hosting acceptance operation for the co-hosting request; and transmitting, at the co-hosting inviting end, a request for joining a co-hosting room to the RTC server after receiving a response message for the co-hosting request from the co-hosting business server, and pushing an audio-video stream to the RTC server upon receipt of a notification message of successfully joining the co-hosting room from the RTC server.

In a third aspect, the present disclosure provides a method for co-hosting. The method is applied to a co-hosting inviting end, and comprises:

transmitting, through a co-hosting business server, a co-hosting request to a co-hosting invitee end; and upon receipt of a response message for the co-hosting request from the co-hosting business server, transmitting a request for joining a co-hosting room to a real-time collaboration, RTC, server, and upon receipt of a notification message of successfully joining the co-hosting room from the RTC server, pushing an audio-video stream to the RTC server.

In an optional implementation, the method further comprises:

upon receipt of a co-hosting acceptance response for the co-hosting request from the co-hosting invitee end through the co-hosting business server, transmitting a first stream combination indication message to the RTC server; wherein the first stream combination indication message is used for indicating enabling stream combination.

In a fourth aspect, the present disclosure provides a method for co-hosting. The method is applied to a co-hosting invitee end, and comprises:

receiving, through a co-hosting business server, a co-hosting request from a co-hosting inviting end; and upon receipt of a co-hosting acceptance operation for the co-hosting request, pushing an audio-video stream to a real-time collaboration, RTC, server.

In an optional implementation, the method further comprises:

upon receipt of the co-hosting acceptance operation for the co-hosting request, starting rendering an audio-video stream pushed by the co-hosting inviting end.

In an optional implementation, the method further comprises:

upon receipt of the co-hosting request from the co-hosting inviting end, transmitting a suspension indication message to the RTC server; wherein the suspension indication message is used to indicate the RTC server to suspend a delivery of an audio-video stream pushed by the co-hosting inviting end to the co-hosting invitee end;

upon receipt of the co-hosting acceptance operation for the co-hosting request, transmitting an unsuspension indication message to the RTC server; wherein the unsuspension indication message is used to indicate the RTC server to start delivering the audio-video stream pushed by the co-hosting inviting end to the co-hosting invitee end.

In an optional implementation, the method further comprises:

upon receipt of the co-hosting acceptance operation for the co-hosting request, transmitting a second stream combination indication message to the RTC server; wherein the second stream combination indication message is used for indicating enabling stream combination.

In a fifth aspect, the present disclosure provides an apparatus for co-hosting. The apparatus comprises:

a first transmitting module configured for transmitting, through a co-hosting business server, a co-hosting request to a co-hosting invitee end;

a second transmitting module configured for upon receipt of a response message for the co-hosting request from the co-hosting business server, transmitting a request for joining a co-hosting room to a real-time collaboration, RTC, server; and a first push module configured for upon receipt of a notification message of successfully joining the co-hosting room from the RTC server, pushing an audio-video stream to the RTC server.

In a sixth aspect, the present disclosure provides an apparatus for co-hosting. The apparatus comprises:

a first receiving module configured for receiving, through a co-hosting business server, a co-hosting request from a co-hosting inviting end; and a second push module configured for upon receipt of a co-hosting acceptance operation for the co-hosting request, pushing an audio-video stream to a real-time collaboration, RTC, server.

In a seventh aspect, the present disclosure provides a computer-readable storage medium. The computer-readable storage medium stores instructions which, when executed on a computer device, cause the computer device to carry out the methods described above.

In an eighth aspect, the present disclosure provides a device comprising a memory, a processor, and a computer program stored on the memory. The computer program, when executed by the processor, carries out the methods described above.

In a ninth aspect, the present disclosure provides a computer program product comprising a computer program/instructions. The computer program/instructions, when executed by a processor, carries out the methods for co-hosting described in the embodiments of the present disclosure.

BRIEF DESCRIPTION OF THE DRAWINGS

The accompanying drawings herein are incorporated into and form a part of the specification, which illustrate the embodiments consistent with the present disclosure, and are used in conjunction with the specification to explain the principles of the present disclosure.

In order to more clearly illustrate the technical solutions in the embodiments of the present disclosure or in the prior art, the accompanying drawings that need to be used in the description of the embodiments or the prior art will be briefly introduced below. It will be apparent to a person of ordinary skill in the art that other accompanying drawings can be acquired based on these accompanying drawings without creative efforts.

FIG. 4 shows a flowchart of a method for co-hosting provided by the embodiments of the present disclosure;

FIG. 5 shows a flowchart of another method for co-hosting provided by the embodiments of the present disclosure;

DETAILED DESCRIPTION

In order to more clearly understand the above objectives, features and advantages of the present disclosure, the embodiments of the present disclosure will be further described below. It is to be noted that the embodiments of the present disclosure and the features in the embodiments may be combined with each other without conflict.

In the following descriptions, many specific details are set forth in order to facilitate a full understanding of the present disclosure, however, the present disclosure may be implemented in other ways than those described herein. It is apparent that the embodiments in the specification are only a part of the embodiments of the present disclosure, and not all of the embodiments.

In the process of network live streaming, a real-time communication interaction in a manner similar to video telephone is often implemented between live streamers or a live streamer and a viewer, which is also known as co-hosting.

The co-hosting efficiency is one of the key factors affecting the experience of users that participate the co-hosting, especially for the user at the co-hosting invitee end who expects to enter the communication interaction interface of co-hosting as soon as possible after actively clicking to accept the co-hosting invitation. Therefore, minimizing the waiting time for the user at the co-hosting invitee end after accepting the co-hosting invitation is one of the ways to improve the user's co-hosting experience.

Currently, after triggering an operation for accepting the co-hosting invitation, the user at the co-hosting invitee end has to wait for a response message returned from a co-hosting business server to push an audio-video stream to a real-time collaborative RTC server, and then wait for the first frame of the co-hosting inviting end to be pulled from the real-time collaboration RTC server, so as to realize the co-hosting between the two parties.

Currently, in the co-hosting for network live streaming, after the user at the co-hosting invitee end actively clicks to accept a co-hosting invitation, the co-hosting invitee end is triggered to transmit a reply request to the co-hosting business server. Only after receiving a reply response for the reply request returned by the co-hosting business server, the co-hosting invitee end starts to push the audio-video stream to the RTC server. When the co-hosting invitee end pulls the first frame from the real-time collaboration RTC server, the co-hosting can be implemented between the two parties. It can be seen that the time consumed from the co-hosting invitee end accepting the co-hosting invitation operation to the first frame being pulled from the co-hosting inviting end is longer, which results in a longer waiting time for the user at the co-hosting invitee end and affects the user's co-hosting experience.

Figure 1:
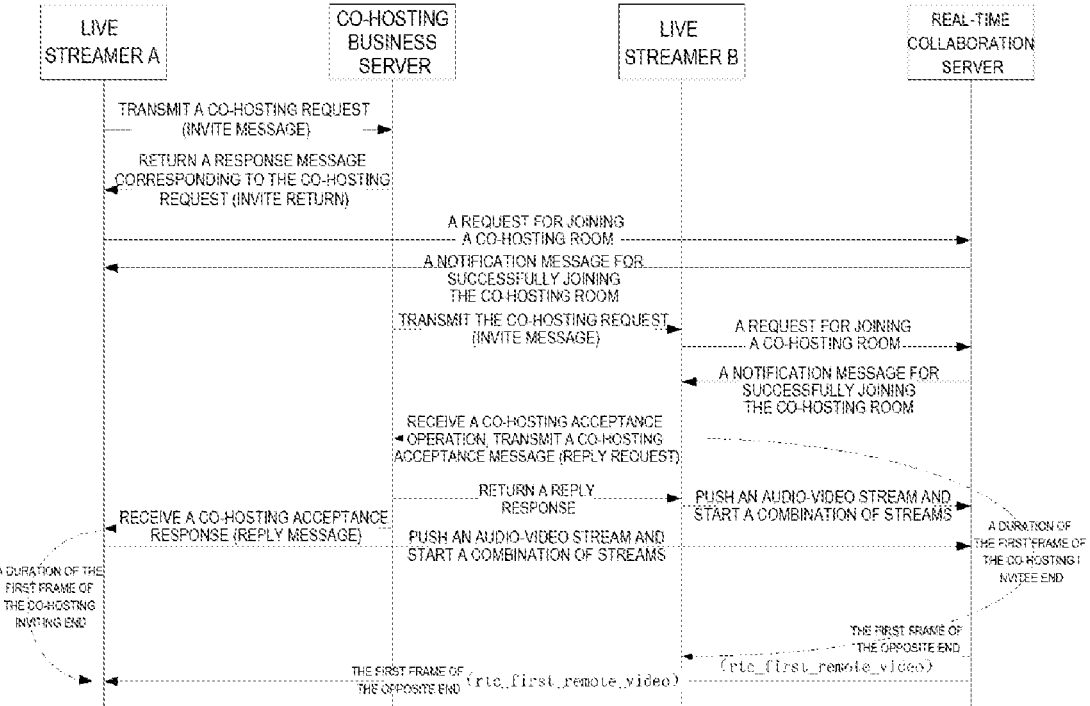
FIG. 1 shows a schematic diagram of data interaction in a way of co-hosting in the current network live streaming.

Taking the co-hosting between the live streamers as an example, a schematic diagram of data interaction in a way of co-hosting in the current network live streaming is shown in FIG. 1. In FIG. 1, the live streamer A transmits a co-hosting request (invite message) to the live streamer B through the co-hosting business server. After the live streamer B receives the co-hosting request from the co-hosting business server, a co-hosting acceptance operation for the co-hosting request may be triggered. When the live streamer B accepts the co-hosting acceptance operation, the live streamer B transmits a co-hosting acceptance message (reply request) to the co-hosting business server. When the live streamer B receives a response message (reply response) for the co-hosting acceptance message from the co-hosting business server, the live streamer B starts to push the audio-video stream to the RTC server, and transmits an indication of enabling stream combination to the RTC server, so as to indicate the RTC server to start combining the streams.

For the live streamer A, after transmitting the co-hosting request to the live streamer B through the co-hosting business server and receiving the response message (invite response) returned by the co-hosting business server, the live streamer A starts to join the virtual co-hosting room of the RTC server. Furthermore, after receiving the co-hosting acceptance operation, the live stream B transmits the co-hosting acceptance message (reply request) to the co-hosting business server. The co-hosting business server forwards a co-hosting acceptance notification message (reply message) for the co-hosting acceptance message to the live streamer A. Upon receipt of the co-hosting acceptance notification message from the co-hosting business server, the live streamer A starts to push the audio-video stream to the RTC server, and at the same time transmits an indication of enabling stream combination to the RTC server, so as to indicate the RTC server to start combining the streams.

As the live streamer B has to wait for the relay response returned by the co-hosting business server after triggering the co-hosting acceptance operation, and only after receiving the relay response does it start pushing the stream to the RTC server, and enable the co-hosting between the two parties only when it can pull the audio-video stream of the opposite end from the RTC server, the live streamer B has to wait for a long time from triggering the co-hosting acceptance operation to enabling the co-hosting between the two parties, which affects the co-hosting experience of the live streamer B.

Figure 2:
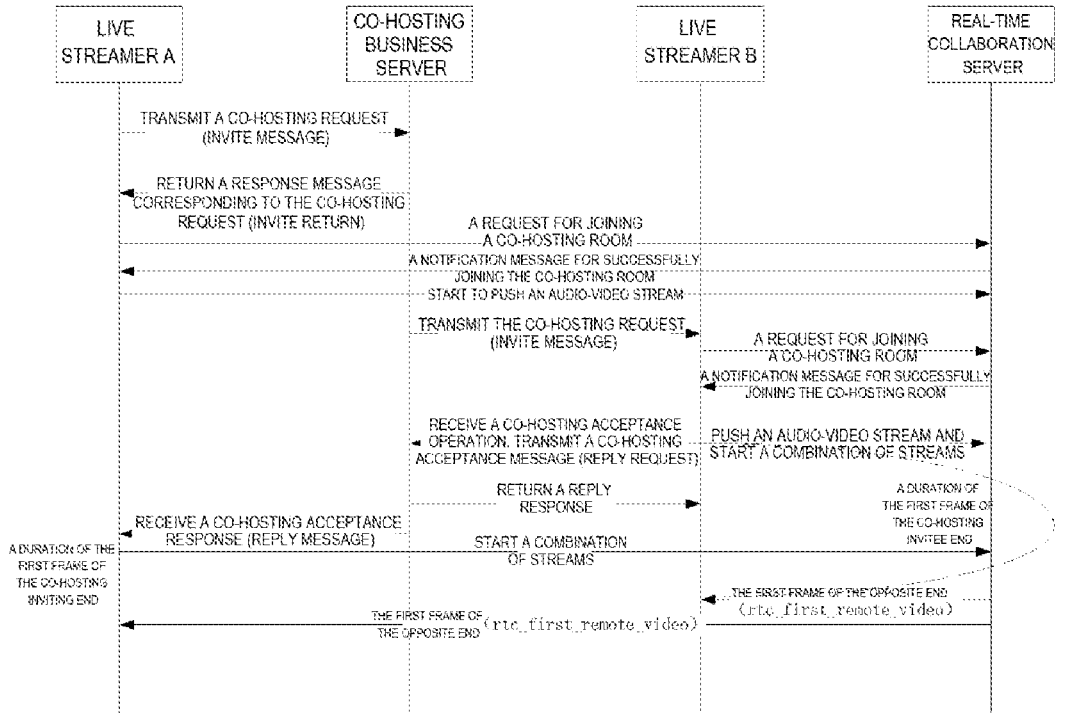
FIG. 2 shows a signaling chart in a system for co-hosting provided by the embodiments of the present disclosure.

To this end, a system for co-hosing is provided by the embodiments of the present disclosure. Referring to FIG. 2, which shows a signaling chart in a system for co-hosting provided by the embodiments of the present disclosure, upon receipt of the co-hosting acceptance operation, the co-hosting invitee end (live streamer B) starts to push the audio-video stream to the RTC server. It can be seen that the live streamer B advances the timing of pushing the stream to the RTC server. Furthermore, upon receiving a notification message of successfully joining the co-hosting room, the live streamer A starts to push the audio-video stream to the RTC server. When pushing the stream to the RTC server, the live streamer B may pull the first frame of the audio-video stream of the live streamer A from the RTC server, which enables the co-hosting between the two parties.

As can be seen, since in the system for co-hosting provided by the embodiments of the present disclosure, both the live streamers A and B advance the timing of pushing the stream to the RTC server, the live streamer B needs to wait for a shorter time from triggering the co-hosting acceptance operation to enabling the co-hosting between the two parties, which reduces the consuming time of the first frame of the live streamer B and improves the co-hosting experience of the live streamer B.

Figure 3:
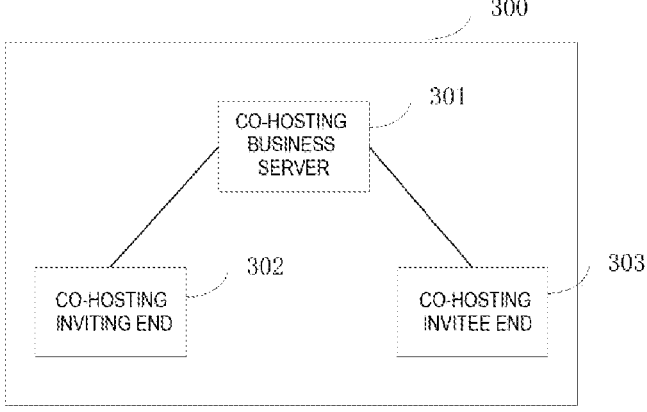
FIG. 3 shows a schematic diagram of a structure of a system for co-hosting provided by the embodiments of the present disclosure.

Based on this, a system for co-hosing is provided by the embodiments of the present disclosure. Referring to FIG. 3, which shows a schematic structural diagram of the system for co-hosting provided by the embodiments of the present disclosure. The system 300 for co-hosting comprises a co-hosting business server 301, a co-hosting inviting end 302 and a co-hosting invitee end 303;

The co-hosting invitee end 302 is configured to receive a co-hosting request from the co-hosting inviting end 302 through the co-hosting business server 301, and upon receipt of a co-hosting acceptance operation for the co-hosting request, push an audio-video stream to a real-time collaboration RTC server.

The co-hosting inviting end 303 is configured to after receiving a response message for the co-hosting request from the co-hosting business server 301, transmit a request for joining a co-hosting room to the RTC server, and upon receipt of a notification message of successfully joining the co-hosting room from the RTC server, push an audio-video stream to the RTC server.

In the embodiments of the present disclosure, the co-hosting request is used to request the co-hosting invitee end to accept the co-hosting invitation from the co-hosting inviting end. Specifically, the co-hosting inviting end transmits the co-hosting request to the co-hosting invitee end through the co-hosting business server to request the co-hosting invitee end to accept the co-hosting invitation.

Upon receipt of the co-hosting request, the co-hosting invitee end may trigger a co-hosting acceptance operation or a co-hosting rejection operation for the co-hosting request. If the co-hosting inviting end receives the co-hosting acceptance operation for the co-hosting request from the co-hosting invitee end, the co-hosting invitee end may transmit a co-hosting acceptance message to the co-hosting business server, while start pushing the audio-video stream to the real-time collaboration RTC server.

As can be seen that in the embodiments of the present disclosure, the co-hosting invitee end can start pushing the stream to the RTC server without waiting for a response message for the co-hosting acceptance message from the co-hosting business server, and thus advancing the timing of pushing the stream. If the co-hosting invitee end can pull the audio-video stream of the opposite end at this time, then for the co-hosting invitee end, a rapid co-hosting after triggering the co-hosting acceptance operation can be enabled, which improves the user experience.

In the embodiments of the present disclosure, after the co-hosting inviting end transmits the co-hosting request to the co-hosting business server, and receives the response message for successful receipt of the co-hosting request, the co-hosting inviting end transmits a request for joining the co-hosting room to the RTC server to apply for joining the virtual co-hosting room. Once the co-hosting inviting end receives the notification message of successfully joining the co-hosting room from the RTC server, which indicates that the co-hosting inviting end has joined the virtual co-hosting room, the co-hosting inviting end may start pushing the audio-video stream to the RTC server.

As can be seen in the embodiments of the present disclosure, the co-hosting inviting end can also start pushing the stream to the RTC server without waiting for the co-hosting acceptance notification message for the co-hosting request from the co-hosting business server, and thus advancing the timing that the co-hosting inviting end pushes the audio-video stream to the RTC.

Since in the embodiments of the present disclosure, the co-hosting inviting end can start pushing the audio-video stream to the RTC server upon receipt of the notification message of successfully joining the co-hosting room, when the co-hosting invitee end receives the co-hosting acceptance operation for the co-hosting request, it can not only start pushing the stream to the RTC server, but also pull the audio-video stream of the co-hosting inviting end from the RTC server, which reduces the waiting time for the first frame at the co-hosting invitee end, and improves the co-hosting experience of the user at the co-hosting invitee end.

Furthermore, since the co-hosting inviting end advances the timing of pushing the stream to the RTC server, after the co-hosting invitee end pushes the stream to the RTC server, the co-hosting inviting end can pull the audio-video stream of the opposite end from the RTC server, which also reduces the waiting time for the first frame at the co-hosting inviting end, and improves the co-hosting experience of the user at the co-hosting inviting end.

In practical applications, the co-hosting inviting end can start pushing the audio-video stream to the RTC server upon receipt of the notification message of successfully joining the co-hosting room, and before the co-hosting invitee end receives the co-hosting acceptance operation, that is in a case where the co-hosting invitee end does not agree to co-host, the co-hosting invitee end may receive the audio-video stream from the co-hosting inviting end, which results in a poor user experience for the co-hosting invitee end.

Therefore, the system for co-hosting provided by the embodiments of the present disclosure needs to improve the functions for the above content. In an optional implementation, when the co-hosting invitee end does not receive the co-hosting acceptance operation for the co-hosting request, the audio-video stream of the opposite end pulled by the co-hosting invitee end may be muted. In particular, when the co-hosting invitee end does not receive the co-hosting acceptance operation for the co-hosting request, the pulled audio-video stream of the co-hosting inviting end is not rendered, and when receiving the co-hosting acceptance operation for the co-hosting request, the co-hosting invitee end starts rendering the audio-video stream pushed by the co-hosting inviting end, and thus enabling the co-hosting.

As can be seen that in the embodiments of the present disclosure, the co-hosting invitee end starts rendering the audio-video stream pushed by the co-hosting inviting end only when it receives the co-hosting acceptance operation for the co-hosting request, which avoids rendering the audio-video stream of the co-hosting inviting side at the co-hosting invitee end in a case where the co-hosting invitee end does not agree to co-host, and improves the co-hosting experience of users at the co-hosting inviting end.

Since in the above implementations, the audio-video stream of the co-hosting inviting end pulled in advance by the co-hosting invitee end occupies the resources of the co-hosting invitee end, such as, bandwidth, CPU resources, etc., the co-hosting invitee end may experience phenomena, such as lagging, which affects the user experience at the co-hosting invitee end. To this end, the embodiments of the present disclosure also provide an approach of function optimization.

Specifically, upon receipt of the co-hosting request from the co-hosting inviting end, the co-hosting invitee end transmits a suspension indication message to the RTC server. The suspension indication message is used to indicate the RTC server to suspend a delivery of an audio-video stream pushed by the co-hosting inviting end to the co-hosting invitee end. Additionally, upon receipt of the co-hosting acceptance operation for the co-hosting request, the co-hosting invitee end transmits an unsuspension indication message to the RTC server. The unsuspension indication message is used to indicate the RTC server to start delivering the audio-video stream pushed by the co-hosting inviting end to the co-hosting invitee end.

Accordingly, in order to implement the approach of the above function optimization, the embodiments of the present disclosure also provide a system for co-hosting which includes not only the co-hosting business server, the co-hosting inviting end and the co-hosting invitee end, but also a RTC server with a frame buffering function.

Specifically, the RTC server is configured to store the audio-video stream pushed by the co-hosting inviting end, and upon receipt of the suspension indication message from the co-hosting invitee end, suspend the delivery of the audio-video stream to the co-hosting invitee end, and upon receipt of the unsuspension indication message from the co-hosting invitee end, start delivering the audio-video stream to the co-hosting invitee end.

Since in the above implementations, the RTC server stores the audio-video stream pushed by the co-hosting inviting end by utilizing the frame buffering function, and delivers the audio-video stream to the co-hosting invitee end only when receiving the unsuspension indication message from the co-hosting invitee end, and thus enabling the co-hosting. Therefore, in the embodiments of present disclosure, there is no need to occupy the resources of the co-hosting invitee end, thus avoiding the lag generated at the co-hosting invitee end, and improves the user experience at the co-hosting invitee end.

Additionally, the RTC server also has a stream combination function, which is specifically used for obtaining a combined audio-video stream by combining the audio-video streams pushed by the co-hosting invitee end and the co-hosting inviting end. The combined audio-video stream may be used to display in a live stream room at the co-hosting invitee end or the co-hosting inviting end.

In the embodiments of the present disclosure, the co-hosting inviting end is also configured to upon receipt of a co-hosting acceptance response for the co-hosting request from the co-hosting invitee end through the co-hosting business server, transmit a first stream combination indication message to the RTC server. The first stream combination indication message is used to indicate the RTC server to combine the audio-video streams pushed by the co-hosting invitee end and the co-hosting inviting end. The combined audio-video stream obtained based on the first stream combination indication message is used to display in a live stream room at the co-hosting inviting end.

As can be seen that the co-hosting inviting end in the system for co-hosting provided by the embodiments of the present disclosure separates the timings of pushing the stream to the RTC server and indicating the RTC server to enable stream combination, and advances the timing of pushing the stream to the RTC server, while maintains the timing of transmitting the first stream combination indication message to the RTC server, that is, still transmits the first stream combination indication message to the RTC server upon receipt of the co-hosting acceptance response. Since the co-hosting inviting end pushes the stream in advance, a duration from the co-hosting inviting end receiving the co-hosting acceptance response to enabling the co-hosting is saved. Therefore, the embodiments of the present disclosure can also reduce a waiting time for the first frame at the co-hosting inviting end.

Additionally, the co-hosting invitee end is also configured to upon receipt of the co-hosting acceptance operation for the co-hosting request, transmit a second stream combination indication message to the RTC server. The second stream combination indication message is used for indicating enabling stream combination.

In the embodiments of the present disclosure, the co-hosting invitee end transmits the second stream combination indication message to the RTC server upon receipt of the co-hosting acceptance operation for the co-hosting request. Specifically, the combined audio-video stream obtained based on the second stream combination indication message is used to display in a live stream room at the co-hosting invitee end.

Based on the system for co-hosting in the above embodiments, the present disclosure provides a method for co-hosting. Referring to FIG. 4, which shows a flowchart of a method for co-hosting provided by the embodiments of the present disclosure, the method is applied to the system for co-hosting described above. The system for co-hosting includes a co-hosting business server, a co-hosting inviting end and a co-hosting invitee end. The method for co-hosting includes:

S401: transmitting, at the co-hosting inviting end, a co-hosting request to the co-hosting invitee end through the co-hosting business server.

S402: pushing, at the co-hosting invitee end, an audio-video stream to a real-time collaboration RTC server upon receipt of a co-hosting acceptance operation for the co-hosting request.

S403: transmitting, at the co-hosting inviting end, a request for joining a co-hosting room to the RTC server after receiving a response message for the co-hosting request from the co-hosting business server, and pushing an audio-video stream to the RTC server upon receipt of a notification message of successfully joining the co-hosting room.

In the method for co-hosting provided by the embodiments of the present disclosure, the co-hosting invitee end pushes the audio-video stream to the RTC server upon receipt of the co-hosting acceptance operation, while the co-hosting inviting end pushes the audio-video stream to the RTC server upon receipt of the notification message of co-hosting acceptance operation. In this way, both the co-hosting inviting end and the co-hosting invitee end advance the timings of pushing the streams to the RTC server, so that the co-hosting invitee end can rapidly pull the first frame of the co-hosting inviting end after accepting the co-hosting invitation, which reduces the consumed time for the first frame of the co-hosting invitee end, and shortens the waiting time for the user at the co-hosting invitee end after accepting the co-hosting invitation, which improves the user's co-hosting experience.

In an optional implementation, in order to avoid from rendering the audio-video stream of the opposite end at the co-hosting invitee end when the co-hosting invitee end does not accept the co-hosting invitation, the co-hosting invitee end may start rendering the audio-video stream pulled from the RTC server upon receipt of the co-hosting acceptance operation for the co-hosting request, and the audio-video stream is pushed from the co-hosting inviting end to the RTC server.

In another optional implementation, in order to avoid the audio-video stream from the co-hosting inviting end being pulled to the co-hosting invitee end in advance from occupying resources, the co-hosting invitee end transmits the suspension indication message to the RTC server upon receipt of the co-hosting request from the co-hosting inviting end through the co-hosting business server; and transmits the unsuspension indication message to the RTC server upon receipt of the co-hosting acceptance operation for the co-hosting request through the co-hosting business server.

The suspension indication message is used to indicate the RTC server to suspend a delivery of the audio-video stream pushed by the co-hosting inviting end to the co-hosting invitee end. The unsuspension indication message is used to indicate the RTC server to start delivering the audio-video stream pushed by the co-hosting inviting end to the co-hosting invitee end.

Accordingly, the RTC server has the frame buffering function. Specifically, the RTC server stores the audio-video stream pushed by the co-hosting inviting end, and upon receipt of the suspension indication message from the co-hosting invitee end, suspends the delivery of the audio-video stream to the co-hosting invitee end, and upon receipt of the unsuspension indication message from the co-hosting invitee end, starts delivering the audio-video stream to the co-hosting invitee end.

Based on the above system and method embodiments, the present disclosure further provides a method for co-hosting that is applied to the co-hosting inviting end. Referring to FIG. 5, which shows a flowchart of another method for co-hosting provided by the embodiments of the present disclosure. The method includes:

S501: transmitting, through a co-hosting business server, a co-hosting request to a co-hosting invitee end.

S502: upon receipt of a response message for the co-hosting request from the co-hosting business server, transmitting a request for joining a co-hosting room to a real-time collaboration RTC server, and upon receipt of a notification message of successfully joining the co-hosting room from the RTC server, pushing an audio-video stream to the RTC server.

In the embodiments of the present disclosure, the co-hosting inviting end transmits the co-hosting request to the co-hosting invitee end through the co-hosting business server. After receiving the co-hosting request (invite message), the co-hosting business server first returns a response message (invite message) to the co-hosting inviting end to notify the co-hosting inviting end that it has received the co-hosting request. After receiving the response message, the co-hosting inviting end starts transmitting a request for joining a co-hosting room (rtc_join_channel message) to the RTC server to request for joining the virtual co-hosting room. The response message carries information, such as, room number of the virtual co-hosting room, etc.

In the embodiments of the present disclosure, after transmitting the request for joining the co-hosting room to the RTC server, if the co-hosting inviting end receives the notification message of successfully joining the co-hosting room from the RTC server, it indicates that the co-hosting inviting end has successfully joined the virtual co-hosting room. At this point, the co-hosting inviting end may start pushing the audio-video stream to the RTC server to advance the timing of pushing the stream by the co-hosting inviting end.

In practical applications, after the co-hosting inviting end transmits the co-hosting request to the co-hosting invitee end, if the co-hosting invitee end accepts the co-hosting invitation, the co-hosting acceptance response for the co-hosting request is returned to the co-hosting business server. At this point, if the co-hosting inviting end receives the co-hosting acceptance response, it transmits the first stream combination indication message to indicate the RTC server to enable stream combination.

As can be seen that in the method for co-hosting provided by the embodiments of the present disclosure, the timings of the co-hosting inviting end pushing the stream to the RTC server and the co-hosting inviting end transmitting the first stream combination indication message to the RTC server are different, and the timing of the co-hosting inviting end pushing the stream to the RTC server is advanced, thus reducing the waiting time for the first frame of the co-hosting invitee end and improving the user's co-hosting experience.

Figure 6:
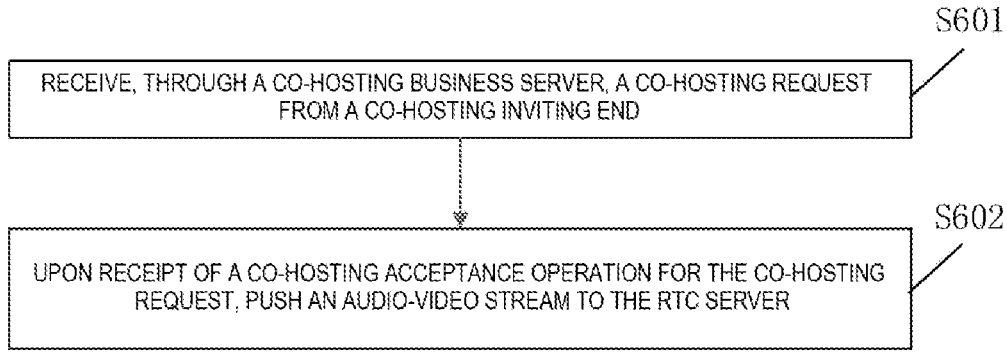
FIG. 6 shows a flowchart of yet another method for co-hosting provided by the embodiments of the present disclosure.

Based on the above system embodiments, the present disclosure further provides a method for co-hosting that is applied to the co-hosting invitee end. Referring to FIG. 6, which shows a flowchart of yet another method for co-hosting provided by the embodiments of the present disclosure. The method includes:

S601: receiving, through a co-hosting business server, a co-hosting request from a co-hosting inviting end.

S602: upon receipt of a co-hosting acceptance operation for the co-hosting request, pushing an audio-video stream to a real-time collaboration RTC server.

In the embodiments of the present disclosure, after the co-hosting invitee end receives the co-hosting request from the co-hosting inviting end, if the co-hosting invitee end accepts the co-hosting invitation, the co-hosting acceptance operation may be triggered. If the co-hosting invitee end receives the co-hosting acceptance operation for the co-hosting request, the co-hosting invitee end may start pushing the audio-video stream to the RTC server without waiting for a response for the co-hosting acceptance message from the co-hosting business server, which reduces the waiting time for the first frame of the co-hosting invitee end, and improves the user's co-hosting experience.

In an optional implementation, the co-hosting inviting end starts pushing the stream to the RTC server upon receipt of the notification message of successfully joining the co-hosting room from the RTC server. In order to avoid the co-hosting inviting end from receiving the audio-video stream of the opposite end without agreeing to co-hosting, the embodiments of the present disclosure can start rendering the audio-video stream pushed by the co-hosting inviting end when the co-hosting invitee end receives the co-hosting acceptance operation for the co-hosting request, so as to avoid from rendering the audio-video stream of the opposite end in a case where the co-hosting invitee end does not accept the co-hosting invitation.

In order to avoid the resources being occupied due to the co-hosting invitee end receiving the audio-video stream of the co-hosting inviting end in advance, the embodiments of the present disclosure can also enable a remote mute function based on the frame buffering function of the RTC server.

Specifically, upon receipt of the co-hosting request from the co-hosting inviting end, the co-hosting invitee end transmits the suspension indication message to the RTC server. The suspension indication message is used to indicate the RTC server to suspend the delivery of the audio-video stream pushed by the co-hosting inviting end to the co-hosting invitee end.

Additionally, upon receipt of the co-hosting acceptance operation for the co-hosting request, the co-hosting invitee end transmits the unsuspension indication message to the RTC server. The unsuspension indication message is used to indicate the RTC server to start delivering the audio-video stream pushed by the co-hosting inviting end to the co-hosting invitee end.

In practical applications, since the RTC server receives the suspension indication message from the co-hosting invitee end, even if the RTC server receives the audio-video stream pushed by the co-hosting inviting end, it will not deliver the audio-video stream to the co-hosting invitee end, instead, will be stored in the RTC server. Only when the RTC server receives the unsuspension indication message from the co-hosting invitee end, it starts pushing the audio-video stream of the opposite end to the co-hosting invitee end and enables the co-hosting.

Additionally, the co-hosting invitee end is further configured to transmit the second stream combination indication message to the RTC server upon receipt of the co-hosting acceptance operation for the co-hosting request; wherein the second stream combination indication message is used for indicating enabling stream combination. Specifically, the combined audio-video stream obtained based on the second stream combination indication message is used to display in a live stream room at the co-hosting invitee end.

Figure 7:
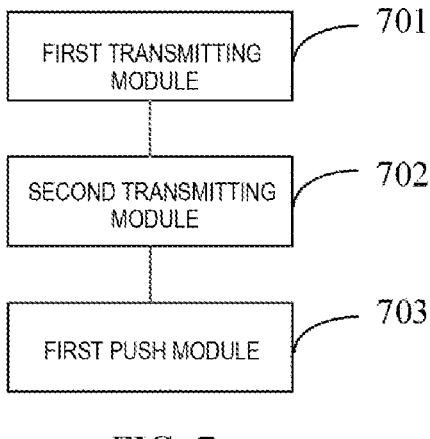
FIG. 7 shows a schematic structural diagram of an apparatus for co-hosting provided by the embodiments of the present disclosure.

The present disclosure further provides an apparatus for co-hosting, which is based on the same inventive concept as the system and method embodiments described above. Referring to FIG. 7, which shows a schematic structural diagram of an apparatus for co-hosting provided by the embodiments of the present disclosure. The apparatus is applied to the co-hosting inviting end and comprises:

a first transmitting module 701 configured for transmitting, through a co-hosting business server, a co-hosting request to a co-hosting invitee end;

a second transmitting module 702 configured for upon receipt of a response message for the co-hosting request from the co-hosting business server, transmitting a request for joining a co-hosting room to a real-time collaboration, RTC, server;

a first push module 703 configured for upon receipt of a notification message of successfully joining the co-hosting room from the RTC server, pushing an audio-video stream to the RTC server.

In an optional implementation, the apparatus further comprises:

a third transmitting module configured for upon receipt of a co-hosting acceptance response for the co-hosting request from the co-hosting invitee end through the co-hosting business server, transmitting a first stream combination indication message to the RTC server; wherein the first stream combination indication message is used for indicating enabling stream combination.

Figure 8:
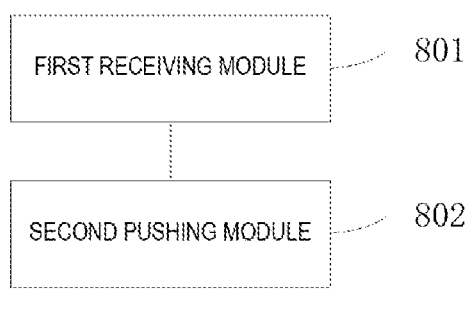
FIG. 8 shows a schematic structural diagram of another apparatus for co-hosting provided by the embodiments of the present disclosure.

The present disclosure further provides an apparatus for co-hosting, which is based on the same inventive concept as the system and method embodiments described above. Referring to FIG. 8, which shows a schematic structural diagram of another apparatus for co-hosting provided by the embodiments of the present disclosure.

The apparatus is applied to the co-hosting invitee end and comprises:

a first receiving module 801 configured for receiving, through a co-hosting business server, a co-hosting request from a co-hosting inviting end;

a second push module 802 configured for upon receipt of a co-hosting acceptance operation for the co-hosting request, pushing an audio-video stream to a real-time collaboration RTC server.

In an optional implementation, the apparatus further comprises:

a rendering module configured for upon receipt of the co-hosting acceptance operation for the co-hosting request, starting rendering an audio-video stream pushed by the co-hosting inviting end.

In an optional implementation, the apparatus further comprises:

a fourth transmitting module configured for upon receipt of the co-hosting request from the co-hosting inviting end through the co-hosting business server, transmitting a suspension indication message to the RTC server; wherein the suspension indication message is used to indicate the RTC server to suspend a delivery of an audio-video stream pushed by the co-hosting inviting end to the co-hosting invitee end;

a fifth transmitting module configured for upon receipt of the co-hosting acceptance operation for the co-hosting request through the co-hosting business server, transmitting an unsuspension indication message to the RTC server; wherein the unsuspension indication message is used to indicate the RTC server to start delivering the audio-video stream pushed by the co-hosting inviting end to the co-hosting invitee end.

In the embodiments of the present disclosure, the co-hosting invitee end pushes the audio-video stream to the RTC server upon receipt of the co-hosting acceptance operation, while the co-hosting inviting end pushes the audio-video stream to the RTC server upon receipt of the notification message of successfully joining the co-hosting room.

In this way, both the co-hosting inviting end and the co-hosting invitee end advance the timings of pushing the streams to the RTC server, which reduces the consumed time for the first frame of the co-hosting invitee end, and shortens the waiting time for the user at the co-hosting invitee end after accepting the co-hosting invitation, which improves the user's co-hosting experience.

In the embodiments of the present disclosure, the co-hosting invitee end transmits the second stream combination indication message to the RTC server upon receipt of the co-hosting acceptance operation for the co-hosting request; wherein the second stream combination indication message is used for indicating enabling stream combination.

In addition to the methods and apparatuses described above, the embodiments of the present disclosure further provide a computer readable storage medium having instructions stored therein, which, when executed on a terminal device, cause the terminal device to carry out the methods for co-hosting described in the embodiments of the present disclosure.

The embodiments of the present disclosure further provide a computer program product comprising a computer program/instructions. The computer program/instructions, when executed by a processor, carries out the methods for co-hosting described in the embodiments of the present disclosure.

Figure 9:
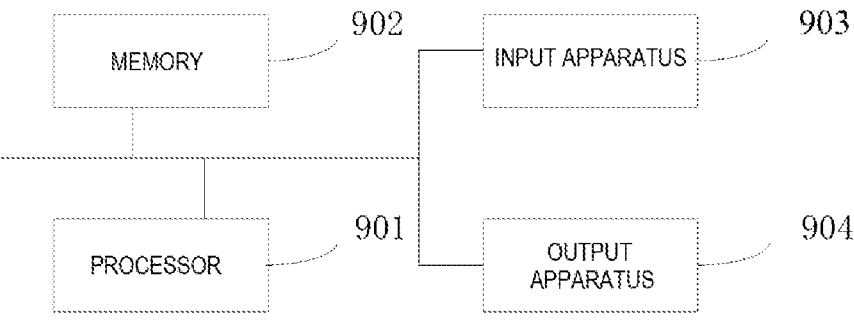
FIG. 9 is a schematic structural diagram of a device for co-hosting provided by the embodiments of the present disclosure.

Additionally, the embodiments of the present disclosure further provide a device for co-hosting, as shown in FIG. 9, which may comprise:

a processor 901, a memory 902, an input device 903 and an output device 904. Although a single processor is given in the FIG. 9 as an example, the number of processor 901 in the device for co-hosting may be one or more. In some of the embodiments of the present disclosure, the processor 901, the memory 902, the input device 903 and the output device 904 may be connected via a bus or any other means, and a connection via the bus is given in the FIG. 9 as an example.

The memory 902 may be used to store software programs and modules, and the processor 901 performs various functional applications of the device for co-hosting and data processing by executing the software programs and the modules stored in the memory 902. The memory 902 may mainly include a program storage region and a data storage region, wherein the program storage region may store an operating system, an application program required for at least one function, and the like. Additionally, the memory 902 may include a high-speed random access memory, and may also include a non-volatile memory, such as at least one disk storage, a flash storage, or other volatile solid state storage. The input device 903 may be used to receive the inputted numerical or character information, as well as to generate signal inputs related to user settings as well as function control of the device for co-hosting.

Specifically, in the embodiment, the processor 901 may load the executable file corresponding to the process of one or more applications into the memory 902 in accordance with the following instructions, and the processor 901 executes the applications stored in the memory 902, thereby carrying out various functions of the device for co-hosting described above.

It is noted that, the relational terms such as "first" and "second" are used herein only to distinguish one entity or operation from another entity or operation and do not necessarily require or imply that any such actual relationship or order exists between these entities or operations. Furthermore, the terms "including", "comprising", or any other variant thereof, are intended to cover non-exclusive inclusion, such that a process, method, article, or device comprising a set of elements includes not only those elements, but also other elements not expressly listed, or also includes elements that are inherent to such process, method, article or device. Without further limitations, the element defining by the phrase "comprising one of . . . " does not exclude the existence of additional identical elements in the process, method, article or device that includes said element.

The detailed description of the present disclosure described above is only given to enable those skilled in the art to understand or implement the present disclosure. Various modifications to those embodiments will be apparent to those skilled in the art, and the general principles defined herein may be implemented in other embodiments without departing from the spirit or scope of the present disclosure. Therefore, the present disclosure will not be limited to those embodiments described herein, but will be subject to the broadest scope consistent with the principles and novel features disclosed herein.

What is claimed is:

1. A system for co-hosting, wherein the system comprises a co-hosting business server, a real-time collaboration, RTC, server, a co-hosting inviting device and a co-hosting invitee device;

the co-hosting invitee device is configured to receive a co-hosting request from the co-hosting inviting device through the co-hosting business server, and upon receipt of a co-hosting acceptance operation for the co-hosting request, push an audio-video stream to, the RTC server; and the co-hosting inviting device is configured to after receiving a response message for the co-hosting request from the co-hosting business server, transmit a request for joining a co-hosting room to the RTC server, to apply for joining the co-hosting room, and upon receipt of a notification message of successfully joining the co-hosting room from the RTC server, push an audio-video stream to the RTC server, wherein the response message is used to notify the co-hosting inviting device that the co-hosting business server has received the co-hosting request, and the notification message of successfully joining the co-hosting room is used to indicate that the co-hosting inviting device has successfully joined the co-hosting room.

2. The system of claim 1, wherein the co-hosting invitee device is further configured to upon receipt of the co-hosting acceptance operation for the co-hosting request, start rendering an audio-video stream pushed by the co-hosting inviting device.

3. The system of claim 1, wherein the co-hosting invitee device is further configured to upon receipt of the co-hosting request from the co-hosting inviting device through the co-hosting business server, transmit a suspension indication message to the RTC server; and upon receipt of the co-hosting acceptance operation for the co-hosting request through the co-hosting business server, transmit an unsuspension indication message to the RTC server;

wherein the suspension indication message is used to indicate the RTC server to suspend a delivery of an audio-video stream pushed by the co-hosting inviting device to the co-hosting invitee device, and the unsuspension indication message is used to indicate the RTC server to start delivering the audio-video stream pushed by the co-hosting inviting device to the co-hosting invitee device.

4. The system of claim 3, wherein the system further comprises the RTC server;

the RTC server is configured to store the audio-video stream pushed by the co-hosting inviting device, and upon receipt of the suspension indication message from the co-hosting invitee device, suspend the delivery of the audio-video stream to the co-hosting invitee device, and upon receipt of the unsuspension indication message from the co-hosting invitee device, start delivering the audio-video stream to the co-hosting invitee device.

5. The system of claim 1, wherein the co-hosting inviting device is further configured to upon receipt of a co-hosting acceptance response for the co-hosting request from the co-hosting invitee device through the co-hosting business server, transmit a first stream combination indication message to the RTC server; wherein the first stream combination indication message is used for indicating enabling stream combination.

6. The system of claim 1, wherein the co-hosting invitee device is further configured to upon receipt of the co-hosting acceptance operation for the co-hosting request, transmit a second stream combination indication message to the RTC server; wherein the second stream combination indication message is used for indicating enabling stream combination.

7. The system of claim 1, wherein both the co-hosting invitee device and the co-hosting inviting device are live streamer devices.

8. A method for co-hosting, wherein the method is applied to a co-hosting inviting device and comprises:

transmitting, through a co-hosting business server, a co-hosting request to a co-hosting invitee device; and upon receipt of a response message for the co-hosting request from the co-hosting business server, transmitting a request for joining a co-hosting room to a real-time collaboration, RTC, server, to apply for joining the co-hosting room, and upon receipt of a notification message of successfully joining the co-hosting room from the RTC server, pushing an audio-video stream to the RTC server, wherein the response message is used to notify the co-hosting inviting device that the co-hosting business server has received the co-hosting request, and the notification message of successfully joining the co-hosting room is used to indicate that the co-hosting inviting device has successfully joined the co-hosting room.

9. The method of claim 8, wherein the method further comprises:

upon receipt of a co-hosting acceptance response for the co-hosting request from the co-hosting invitee device through the co-hosting business server, transmitting a first stream combination indication message to the RTC server; wherein the first stream combination indication message is used for indicating enabling stream combination.

10. A method for co-hosting, wherein the method is applied to a co-hosting invitee device and comprises:

receiving, through a co-hosting business server, a co-hosting request from a co-hosting inviting device, wherein the co-hosting inviting device is used to transmit a request for joining a co-hosting room to a real-time collaboration, RTC, server, upon receipt of a response message for the co-hosting request from the co-hosting business server, so as to apply for joining the co-hosting room, and push an audio-video stream to the RTC server, upon receipt of a notification message of successfully joining the co-hosting room from the RTC server, the response message being used to notify the co-hosting inviting device that the co-hosting business server has received the co-hosting request, and the notification message of successfully joining the co-hosting room being used to indicate that the co-hosting inviting device has successfully joined the co-hosting room; and upon receipt of a co-hosting acceptance operation for the co-hosting request, pushing an audio-video stream to the RTC server.

11. The method of claim 10, wherein the method further comprises:

upon receipt of the co-hosting acceptance operation for the co-hosting request, starting rendering an audio-video stream pushed by the co-hosting inviting device.

12. The method of claim 10, wherein the method further comprises:

upon receipt of the co-hosting request from the co-hosting inviting device, transmitting a suspension indication message to the RTC server; wherein the suspension indication message is used to indicate the RTC server to suspend a delivery of an audio-video stream pushed by the co-hosting inviting device to the co-hosting invitee device;

upon receipt of the co-hosting acceptance operation for the co-hosting request, transmitting an unsuspension indication message to the RTC server; wherein the unsuspension indication message is used to indicate the RTC server to start delivering the audio-video stream pushed by the co-hosting inviting device to the co-hosting invitee device.

13. The method of claim 10, wherein the method further comprises:

upon receipt of the co-hosting acceptance operation for the co-hosting request, transmitting a second stream combination indication message to the RTC server; wherein the second stream combination indication message is used for indicating enabling stream combination.

14. A non-transitory computer-readable storage medium, wherein the computer-readable storage medium stores instructions which, when executed on a computer device, cause the computer device to carry out the method of claim 8.

15. A device comprising a memory, a processor, and a computer program stored on the memory, wherein the computer program, when executed by the processor, carries out the method of claim 8.

16. A computer program product, wherein the computer program product comprises a computer program/instructions which, when executed by a processor, carries out the method of claim 8.

17. A non-transitory computer-readable storage medium, wherein the computer-readable storage medium stores instructions which, when executed on a computer device, cause the computer device to carry out the method of claim 10.

18. A device comprising a memory, a processor, and a computer program stored on the memory, wherein the computer program, when executed by the processor, carries out the method of claim 10.

19. A computer program product, wherein the computer program product comprises a computer program/instructions which, when executed by a processor, carries out the method of claim 10.

* * * * *